Dec. 10, 1957    J. F. MARSHALL ET AL    2,815,587
LORAN TRAINING APPARATUS

Filed July 19, 1946    4 Sheets-Sheet 1

INVENTORS
JOHN F. MARSHALL
RALPH P. SHUTT

BY  *M. O. Hayes*

ATTORNEY

Dec. 10, 1957  J. F. MARSHALL ET AL  2,815,587
LORAN TRAINING APPARATUS
Filed July 19, 1946  4 Sheets-Sheet 2
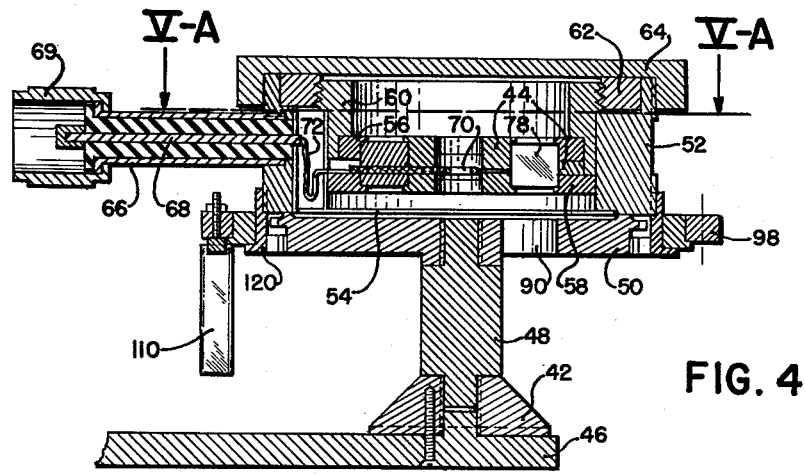
FIG. 4
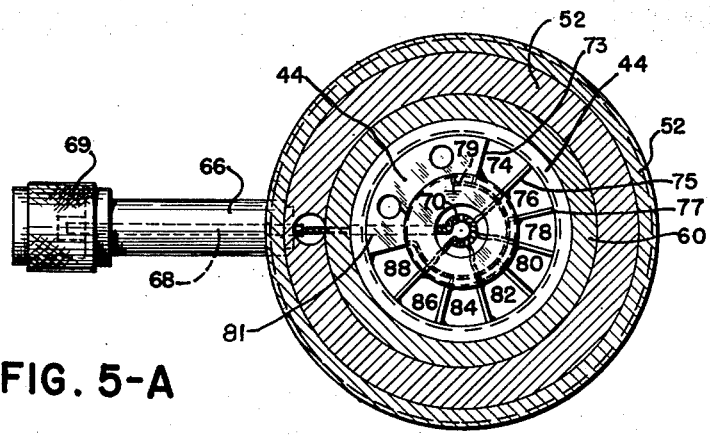
FIG. 5-A
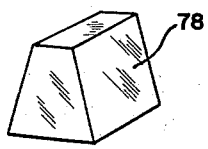
FIG. 5-B
INVENTORS
JOHN F. MARSHALL
RALPH P. SHUTT
BY
ATTORNEY Dec. 10, 1957　　　J. F. MARSHALL ET AL　　　2,815,587
LORAN TRAINING APPARATUS Filed July 19, 1946　　　　　　　　　　　　4 Sheets-Sheet 3

INVENTORS
JOHN F. MARSHALL
RALPH P. SHUTT

BY　M. C. Hayes

ATTORNEY

Dec. 10, 1957  J. F. MARSHALL ET AL  2,815,587
LORAN TRAINING APPARATUS

Filed July 19, 1946  4 Sheets-Sheet 4

INVENTORS
JOHN F. MARSHALL
RALPH P. SHUTT

BY *M. C. Hayes*
ATTORNEY

United States Patent Office 2,815,587
Patented Dec. 10, 1957

2,815,587

LORAN TRAINING APPARATUS

John F. Marshall, Primos, and Ralph P. Shutt, Swarthmore, Pa., assignors to the United States of America as represented by the Secretary of the Navy Application July 19, 1946, Serial No. 684,806

7 Claims. (Cl. 35—10.4)

This invention relates in general to apparatus for training long range navigation (hereinafter termed Loran) operators and more specifically to means for generating supersonic pulses which will in suitable apparatus simulate actual Loran operating conditions including the effects of ground waves, sky waves, and pulse splitting.

Loran is a system of position finding for use on the sea or in the air, by reception of radio frequency signals emitted from transmitting stations of known positions. These stations operate in pairs and emit a steady succession of pulses. By comparing the pulses received from one pair of stations and measuring the time difference between their reception, the difference of the distances of the receiver from the two stations is determined. This data alone establishes the fact that the receiver must lie upon a curve drawn through all points whose distances from these stations differ by the amount determined. Similarly, by comparing pulses received from another pair of stations and drawing a second curve of this type, the receiver's position is uniquely determined and lies at the point of intersection of the aforementioned two curves.

The radiated electromagnetic pulses from the transmitting stations may be received directly, in which case the received signals are called the ground wave, or they may be received after being reflected back from the ionosphere, in which case the pulses are referred to as the sky wave. It will be noted that the terminology "sky wave" and "ground wave" is in accord with the conventional radio transmission art. The position of the receiver which may be shipborne, may be determined from either the sky wave or ground wave. In practice, the sky wave is characterized by a phenomenon known as splitting. Splitting is indicated by a hump appearing on the received pulse, which hump appears to move back and forth between the leading and trailing edges of the pulse as a function of time.

A Loran trainer is a device for simulating practical Loran conditions and presenting data in a manner which permits student receiver operators to familiarize themselves with situations encountered with equipment in the field. An essential element in a trainer is a device for generating signals which upon application to conventional Loran receiving apparatus provides on the indicators thereof a representation of what may be encountered when the same receiver is tuned to actual Loran transmitting stations. In order that operators be properly prepared it is further required that the signal generating device in the trainer be capable of duplicating, in effect, natural phenomena which ordinarily affect radio frequency pulse transmissions.

In accordance with the principles of the present invention electrical training signals for application to a training Loran receiver are generated by developing predetermined supersonic signals, and translating these signals into corresponding electrical signals. This signal generating apparatus is arranged as a model of an actual Loran system. A variety of operating conditions may be simulated by altering the supersonic energy by reflection, splitting, and the like prior to its translation into electrical training signals.

It is accordingly an object of this invention to provide a supersonic trainer capable of simulating substantially all actual Loran operating conditions.

It is another object of this invention to provide means for transmitting supersonic energy to duplicate, in effect, the transmission of electromagnetic sky waves and ground waves.

Still another object of this invention is to provide means for splitting supersonic energy pulses, thereby simulating electromagnetic sky wave pulse splitting.

These and other objects will be apparent from the following specifications when taken with the accompanying drawing in which:

Fig. 4 shows the construction of a transducer used for transmitting supersonic energy in the present Loran trainer;

Figs. 5A, 5B, 6 and 7 show elements of the transducer of Fig. 4 in detail;

The invention will now be described in brief before proceeding with a detailed description of the transducer and its associated components.

Figure 1:
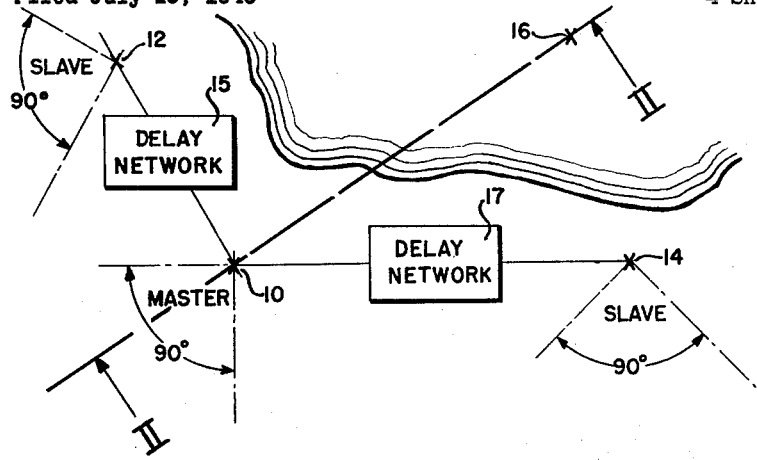
Fig. 1 illustrates a model of a typical Loran system.

Referring now to Fig. 1, there is illustrated a model of a Loran system, set up upon a suitable surface to a predetermined scale. Energy transmitted and received in this model is in the form of supersonic, longitudinal waves in the surrounding space. The master transmitter 10 is accordingly an electrical transducer of a suitable type. Slave transmitters, as used in Loran are represented on this model by electromechanical transducers 12 and 14. The apparatus required to energize the transducers shown has been omitted for simplicity.

Each transducer 10, 12, and 14 provides pulses of supersonic energy with a time relation between each set of pulses dependent on the scale distance between the master transducer 10 and each slave transducer 12 or 14. This delay is provided by delay networks 15 and 17 shown in Fig. 1.

The supersonic pulses transmitted are picked up by a receiving transducer 16 which is mounted on a movable pickup support. The latter transducer represents a Loran receiver, movable as on shipboard. The received pulses are amplified, raised in frequency, and applied to a conventional Loran receiver operated in the usual manner. The wavelength of supersonic energy used is short and small distances are equivalent to long radio ranges; whereby a small model is used to represent a large area.

Figure 2:
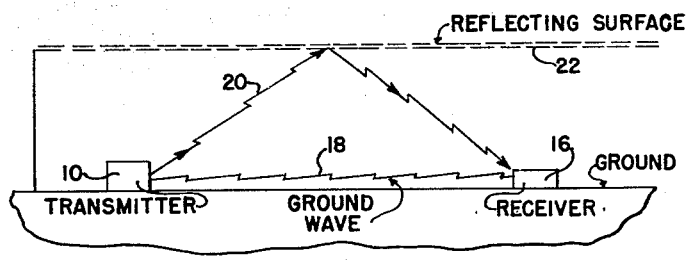
Fig. 2 illustrates the transmission through space of supersonic energy representing ground and sky waves as they appear along axis II—II of the model shown in Fig. 1.

Fig. 2 illustrates supersonic wave paths which in effect correspond to radio ground and sky waves. Inasmuch as the present invention is concerned solely with a Loran model or trainer, the supersonic waves which simulate radio frequency ground and sky waves will hereinbelow be referred to simply as ground and sky waves. In Fig.

2, transmitting transducer 10 of Fig. 1 is shown radiating supersonic energy at two distinct angles. The horizontally radiated energy 18 is the ground wave and the upwardly directed energy 20 is the sky wave. Reflecting surface 22 positioned above the model and not shown in Fig. 1, is used to deflect upward radiations such as 20 from transducer 10. Both ground and sky waves are received by the receiver transducer 16 at the point representing the Loran receiver. In the actual trainer, transmitter 10, receiver 16, and the reflecting surface 22 are all positioned on or supported by a table (not shown) which is the "Ground" indicated in Fig. 2.

Figure 3:
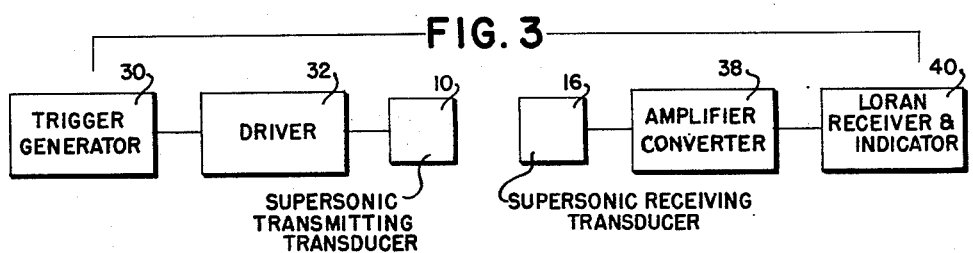
Fig. 3 is a block diagram showing components of the supersonic trainer.

The details of a representative system for producing supersonic pulses, receiving and converting them for use in a conventional Loran receiver for training purposes are shown in block form in Fig. 3. Only one transmitting transducer is shown therein since the slave transducers are essentially the same, being driven through time delay networks as shown in Fig. 1.

A trigger generator 30 is used to supply trigger pulses to a driver 32 which in turn drives the supersonic transmitting transducer 10. Transducer 10 provides supersonic pulses which are picked up by receiving transducer 16 at a time interval after their emission dependent upon the distance between transmitting transducer 10 and receiving transducer 16. The received pulses are then amplified and converted to the operating input signal frequency of the Loran receiver 40 by amplifier and converter 38. The receiver 40 is used in the usual manner to provide operating practice for trainees. A more detailed disclosure of this system is to be found in a report of the Bartol Research Foundation of the Franklin Institute of the State of Pennsylvania entitled "Final Report on Supersonic Loran Trainer."

The present invention is primarily concerned with the structure of the transmitting transducer 10 for producing supersonic waves and simulating Loran effects such as sky wave splitting. The following description concerns this unit in particular.

Referring now to Figs. 4 through 7, the transmitting transducer, consists essentially of a plurality of crystals 74, 76, 78, 80, 82, 84, 86, 88, mounted in a circular holder 44 (Fig. 5A). The supersonic output pulses from these crystals are directed downward at a reflector 42 (Fig. 4) from which they are reflected outwardly and through space to produce supersonic ground and sky waves.

A crystal of the type used in this invention is shown at 78 (Fig. 5B). It is preferably made of Rochelle salt and is commonly known as an "X cut" crystal. It is prism or keystone in shape and the "X cut" refers to the direction of the prism axis as cut from the original crystal.

The transducer unit is constructed upon a base plate 46 (Fig. 4) upon which is mounted a reflector 42. A shaft 48 is fitted into reflector 42 and supports the crystal mount above it. The base of the crystal mount is formed by base plate 50 which includes a slot 90 for permitting the passage of radiation therethrough (also shown in detail in Fig. 6). Base plate 50 is fastened to the outer shell 52 of the assembly. A thin sheet of aluminum foil 54 is placed over the top of plate 50. Crystal holder 44 is supported by rings 56 and 58 fastened thereto. Ring 58 is in turn fastened to sleeve 60. Sleeve 60 is threaded at the upper end thereof which engages a threaded ring 62 resting upon the notched upper end of outer sleeve 52. Ring 62 may be moved up or down along sleeve 60 to position the crystal holder 44 at any desired distance above aluminum foil 54. This permits adjustment to obtain maximum output from the transducer unit illustrated. Cap 64 fastens down upon outer sleeve 52 to enclose the mount. An electrical coupling to the unit is made through sleeve 66 extending from outer sleeve 52 by coaxial wire 68 to the lead 70 at the center of the crystal holder 44. Connection between coaxial wire 68 and lead 70 is made by a small flexible wire 72.

Crystal holder 44 is shown in greater detail in Fig. 5A. The eight crystals 74, 76, 78, 80, 82, 84, 86, and 88 are electrically connected in parallel. The mounting container is filled with castor coil or a similar substance. The arc formed by the crystals does not extend completely around the holder 44 since radiation of supersonic energy is not desired over 360° in azimuth in this application. Electrodes such as 73, 75, and 77, are cemented to both radially positioned sides of each crystal to simplify assembly. These electrodes are brought out alternately to a common ground connection 79 and to lead 70 at the center of the assembly by the radially extending leads such as 81, as shown in Fig. 5A. The direction of the X axis is alternated in adjacent crystals to obtain proper phase relationship. The crystals are pulsed by driver 32 (Fig. 3) which couples through a suitable coaxial cable (not shown) to connector 69 and then through coaxial conductors 66, 68 and leads 70, 72 to the crystal electrodes 73, 75, and 77. The energy generated by these crystals when pulsed is directed down through thin aluminum foil 54 and out opening 90 of the base plate 50, shown in Fig. 6, toward the reflector 42, shown in Fig. 4 and in modified form in Fig. 7. The action of modified reflector 42 is illustrated in detail in Fig. 7. A pulse of supersonic energy is shown traveling along path 92, striking reflector 42 and being dispersed in all directions to produce in effect, a sky wave 96 and a ground wave 94.

Figure 8:
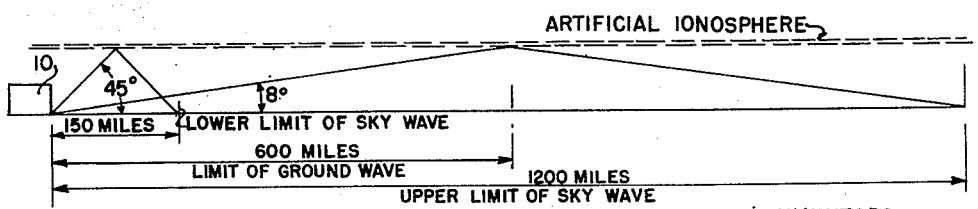
Fig. 8 illustrates means for simulating the effects of sky waves as encountered in Loran.
Figure 6:
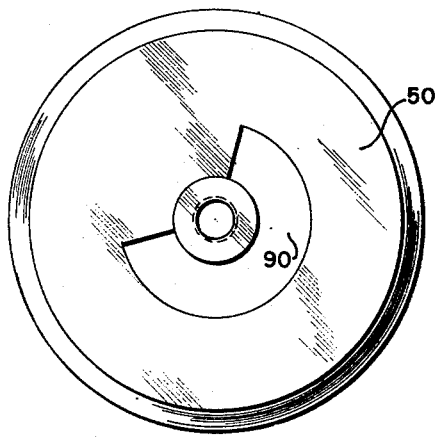
Figure 7:
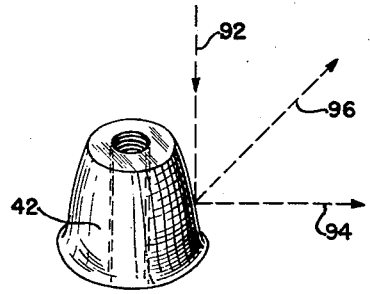

The design of this reflector 42 determines the pattern of the supersonic energy that is transmitted. Fig. 8 shows the general qualitative requirements for range of ground wave and sky wave, and the necessary extreme angles of transmission and reflection required to obtain this pattern for the present example. A transmitter 10 is shown with a reflector which radiates over a range of angle from zero to 45 degrees with the horizontal. Similarly the receiver transducer must be able to receive over these angles. The ground wave 18 (Fig. 2), in the present example, is receivable to an equivalent scale distance of 600 miles before being lost in the noise. The sky wave 20 (Fig. 2), on the other hand is receivable to a scale distance equivalent to 1200 miles. The angles indicated in Fig. 8 are based on the ranges desired and assuming an equivalent sky height of 80 nautical miles. Thus if the scale used is 1 inch equal to 12 nautical miles, the height of the artificial ionosphere equivalent to 80 nautical miles shown in Fig. 8 would be represented by an actual height of approximately 7 inches. That is, the reflecting surface 22 of Fig. 2 would be positioned approximately 7 inches above the "Ground." (This sky height is the optimum one for compromising between various discrepancies which are intrinsic in the system. Namely, the fact that the actual equivalent height of the ionosphere decreases with the distance of the receiver from the transmitting station, and the fact that the Loran trainer herein described operates on a plane surface rather than a sphere. If the sky height is set for the proper value for close sky waves, these two effects happen to cancel each other.)

It is seen from Fig. 8 that the transmitter reflector must be able to radiate over a range of angle of from zero to 45° with the horizontal. Similarly the receiver reflector must be able to receive over these angles. Since the wavelength of sound at the frequency used is comparable to the dimensions of the various segments of the reflectors, there is considerable angular spread from any given region of the reflector. Thus the reflector 42 Fig. 7 can be made up of a series of truncated cones. A reflector having a parabolically curved surface may also be used.

As described previously the radio sky wave in actual practice is characterized by a phenomena known as splitting. Splitting is characterized by a hump appearing on the main pulse. This hump moves back and forth between the leading and trailing edges of the pulse. Occasionally, it moves down the leading edge and disappears, causing a leading edge time shift of the order of 10 to 20 microseconds.

Sky wave splitting can be interpreted as a superposition of reflections from two adjacent layers of the ionosphere, and it is a superposition principle which is herein utilized to duplicate the phenomenon. Two systems, essentially identical in principle, though different in application are illustrated in Fig. 9, and the effect on the sky wave pulses is shown in Fig. 10.

Figure 11:
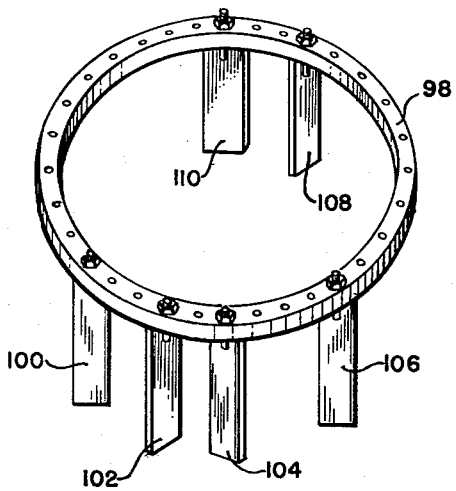
Fig. 11 shows the construction of supersonic pulse splitting apparatus illustrated in principle in Fig. 9.
Figure 9:
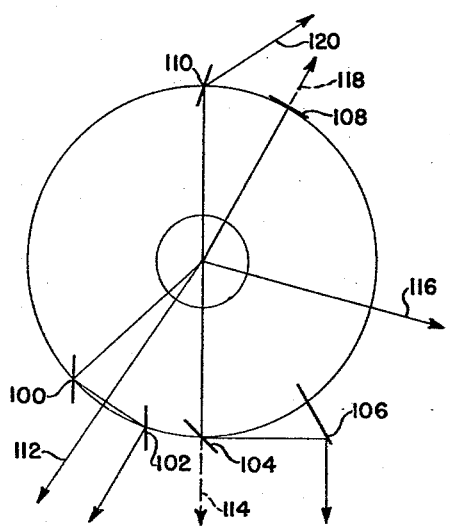
Fig. 9 illustrates the principles of operation of a supersonic wave splitting means.

In Fig. 9, fins 100, 102, 104 and 106, also shown in mechanical detail in Fig. 11, are mounted on a ring 98 which revolves about the transducer as will be described below. As the ring rotates the position of the fins changes with respect to the line connecting the centers of the transmitter and receiver. Three possible conditions are shown in Fig. 9. The lines 112, 114 and 116 which represent beams of supersonic energy, are shown in different positions to simplify presentation. All three conditions may be met for any given position of the receiver during rotation of the fins.

Figure 10:
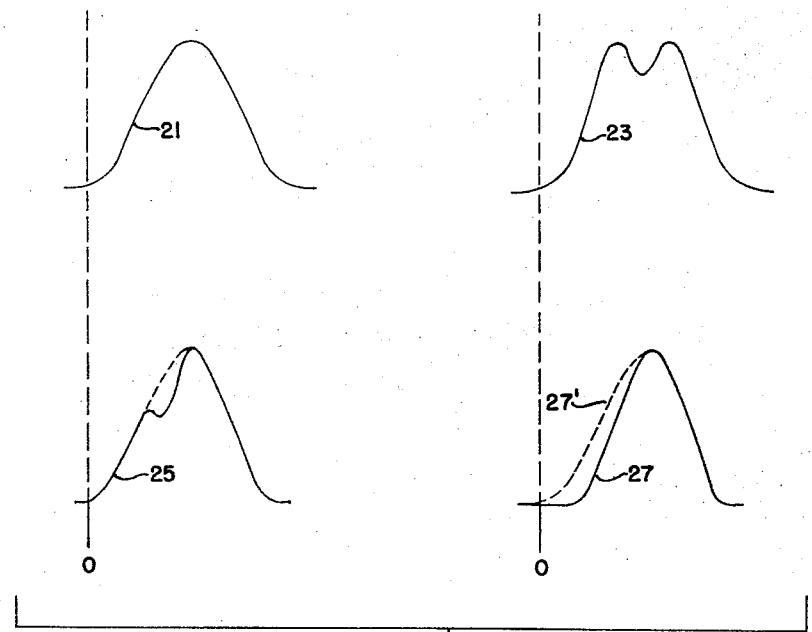
Fig. 10 shows waveforms of pulses produced by wave splitting.

The general forms of the pulse corresponding to the receiver directions 112, 114, 116 are shown in Fig. 10. With the receiver (not shown) along line 112, part of the energy passes directly along direction 112, while part is reflected by fin 100 to fin 102 and thence to the receiver. This results in two superposed pulses with a space between the two peaks thereof, a pulse wave form similar to that shown at 23 Fig. 10.

With the receiver along line 114, the direct beam is blocked entirely, resulting in a leading edge shift in time as shown by edge 27 Fig. 10, displaced from normal leading edge 27'. At 116, the beam is undisturbed, resulting in an unsplit pulse as shown at 21 in Fig. 10.

Motion of the fins with respect to these positions results in a relative change in amplitude of the two components of the split pulse, causing an apparent traveling of an extra hump up and down the leading and trailing edges of the sky wave pulses, as indicated by 25 Fig. 10, and the remaining pulses 21, 23 and 27 of Fig. 10.

Another means for accomplishing this effective pulse splitting is illustrated by fins 108 and 110 in Fig. 9. The fin 108 is set at right angles to the radius and blocks the beam 118, while the fin 110 reflects a portion of the radiation to the receiver along 120. This produces a pattern similar to the one shown in by 27 Fig. 10. It may be seen that when the fins are rotated with respect to the indicated positions the result will be the same as in the other examples illustrated in Fig. 10. The latter means has the advantage that the amplitude of the reflected beam can be made as great as that of the unsplit direct beam so that the overall pattern is not decreased in amplitude.

Fig. 11 shows a view of fins 100, 102, 104, 106, 108, 110 mounted on ring 98. The position of the fins is adjustable for pre-setting the desired angle on each fin. Ring 98 fits around outer sleeve 52 of the transducer and turns on flange 120 as shown in Fig. 4. This ring is driven by a small geared electric motor, 130 Fig. 12, which rotates the ring 98 and attached fins 100, 102, 104 and the like across the axis between the receiver and transmitter to produce the pulse splitting effect already described.

Figure 12:
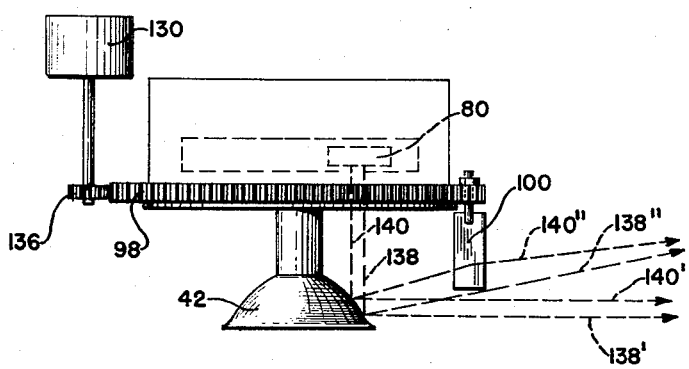
Fig. 12 illustrates the manner in which supersonic waves of various forms are radiated from the transducer shown in Fig. 4.

The general operation of the transducer and the production of pulse splitting will be evident from Fig. 12 which gives a simplified view of the transducer showing only the essential features. Supersonic energy is shown coming from one of the crystals, 80 for example, in the form of beams 138 and 140. This energy strikes the reflector 42 and radiates in all directions as indicated by ground waves 138', 140', and by sky waves 138" and 140". The sky wave 140" is shown striking the reflector fin 100 and will thus be delayed in reaching the receiver with respect to the direct wave 138" shown. This will cause the sky wave pulse to appear split while the ground wave will appear as a steady pulse since the latter radiation from reflector 42 is not blocked or deflected. As described earlier ring 98 carries several reflecting fins similar to 100. The ring 98 with all the fins adjustably attached is rotated by motor 130 through a gear 136. This causes the amount of deflection introduced by fins such as 100, as they pass between the axis between the transmitting transducer and receiving tranducer, to vary the sky wave pulses in the manner indicated in the signals waveforms of Fig. 10.

Thus it may be seen that this invention provides a supersonic generator and transmitter for a Loran trainer which is capable of simulating insofar as a Loran receiver is concerned, ground waves, sky waves, and pulse splitting as encountered in actual Loran operation.

It is believed that the construction and operation as well as the advantages of this improved Supersonic Loran Trainer will be apparent from the foregoing detailed description thereof. It will also be apparent that while the invention has been shown and described in a preferred form changes may be made in the elements disclosed without departing from the spirit of the invention as sought to be defined in the following claims.

What is claimed is:

1. In a trainer for simulating Loran operation, an electro-mechanical transducer comprising, a piezo-electric element for radiating a beam of pulsed supersonic energy, a reflector for dispersing said supersonic beam over a comparatively wide solid angle, reflecting fins suspended above and around said reflector for deflecting a portion of said dispersed supersonic energy radiated in a given direction into two components, and means for changing the position of said fins to vary the proportion of supersonic energy deflected in said given direction, whereby relative change in amplitude of said components simulates Loran radio sky wave pulse splitting phenomena.

2. In a trainer for simulating Loran operation, an electro-mechanical transducer comprising, a plurality of piezo-electric crystal elements arranged to radiate a beam of pulsed supersonic energy, a reflector for dispersing said supersonic beam over a comparatively wide solid angle, low angle supersonic energy being radiated substantially without interference in simulation of Loran ground waves, reflecting fins suspended above and around said reflector for deflecting a portion of high angle supersonic energy radiated in a given direction into two components in simulation of Loran sky waves, and means for varying the position of said fins to cause said two components to shift in time with respect to one another in simulation of Loran sky wave pulse splitting.

3. In a trainer for simulating Loran operation, an electro-mechanical transducer comprising, a plurality of piezo-electric crystal elements arranged to radiate a beam of pulsed supersonic energy, a reflecting surface composed of a series of truncated cones for dispersing said supersonic beam over a comparatively wide solid angle, low angle supersonic energy being radiated substantially without interference in simulation of Loran ground waves, reflecting fins suspended above and around said reflector for deflecting a portion of high angle supersonic energy radiated in a given direction into two components in simulation of Loran sky waves, and means for varying the position of said fins to cause said two components to shift in time with respect to one another in simulation of Loran sky wave pulse splitting.

4. In a trainer for simulating Loran operation, an electro-mechanical transducer comprising, a plurality of piezo-electric crystal elements arranged to radiate a beam of pulsed supersonic energy, a reflector having a parabolically curved surface for dispersing said supersonic beam over a comparatively wide solid angle, low angle supersonic energy being radiated substantially without interference in simulation of Loran ground waves, reflecting fins suspended above and around said reflector for deflecting a portion of high angle supersonic energy radiated in a given direction into two components in simulation of Loran sky waves, and means for varying the position of said fins to cause said two components to shift in time with respect to one another in simulation of Loran sky wave pulse splitting.

5. In a trainer for simulating Loran operation, an electro-mechanical transducer comprising, a plurality of keystone shaped 45° X cut piezo-electric crystals, a cylindrical housing, supporting members for mounting said crystals in said housing so that radiation of supersonic energy by said crystals produces a beam along an arc concentric with the axis of said housing, a reflecting surface composed of a series of truncated cones positioned with respect to said housing to disperse impinging supersonic energy over a comparatively wide solid angle, low angle supersonic energy being radiated substantially without interference in simulation of Loran ground waves, reflecting fins suspended above and around said reflector for deflecting a portion of high angle supersonic energy radiated in a given direction into two components in simulation of Loran sky waves, and means for varying the position of said fins to cause said two components to shift in time with respect to one another in simulation of Loran sky wave pulse splitting.

6. In a trainer for simulating Loran operation, an electromechanical transducer comprising, a plurality of keystone shaped 45° X cut piezo-electric crystals, an oil filled cylindrical housing, an arcuate opening formed in said housing concentric with its axis, supporting members for mounting said crystals in said housing, a thin metal foil disposed adjacent said crystals and over said opening so that radiation of supersonic energy by said crystals produces a beam transmitted by said foil through said opening, a reflecting surface positioned with respect to said housing to disperse impinging supersonic energy over a comparatively wide solid angle, low angle supersonic energy being radiated substantially without interference in simulation of Loran ground waves, reflecting fins suspended above and around said reflecting surface for deflecting a portion of high angle supersonic energy radiated in a given direction into two components shifted in time with respect to one another, and means for automatically varying the position of said fins to cause said two components to vary in time shift with respect to one another in simulation of Loran sky wave pulse splitting.

7. For use in a trainer for simulating the radio frequency pulse signals arriving at a Loran receiver, a transducer, said transducer being adapted to radiate a beam of supersonic energy when periodically activated, first reflecting means for deflecting part of said energy along a first direction and part of said energy along a second direction which is at an acute angle with said first direction, second reflecting means for redirecting some of said energy which was initially deflected along said second direction back along substantially said first direction whereby the signal arriving at a point in said first direction spaced from said transducer has two time spaced components similar to those present in the radio frequency pulse signals arriving at the Loran receiver after experiencing the skywave pulse splitting effect, and means for cyclically varying the amount of supersonic energy redirected back along said first direction by said second reflecting means whereby the wave form of said signal is continuously modified from a single to a double peaked shape.

References Cited in the file of this patent
UNITED STATES PATENTS

| | | |
|---|---|---|
| 1,151,293 | Sawyer | Aug. 24, 1915 |
| 2,216,949 | Kellogg | Oct. 8, 1940 |
| 2,405,591 | Mason | Aug. 13, 1946 |
| 2,448,365 | Gillespie | Aug. 31, 1948 |
| 2,461,181 | Rosenberg | Feb. 8, 1949 |